Patented June 6, 1933

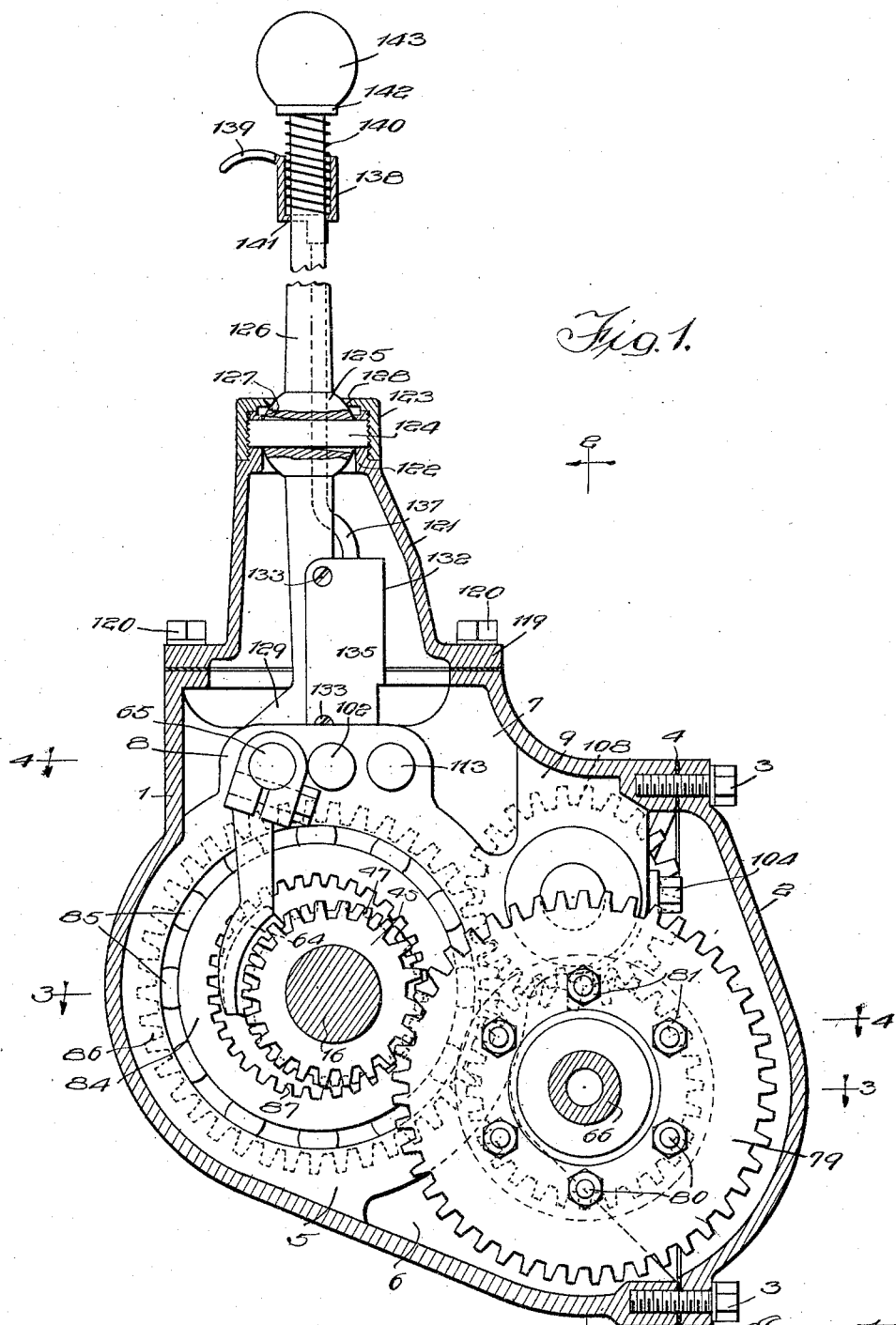

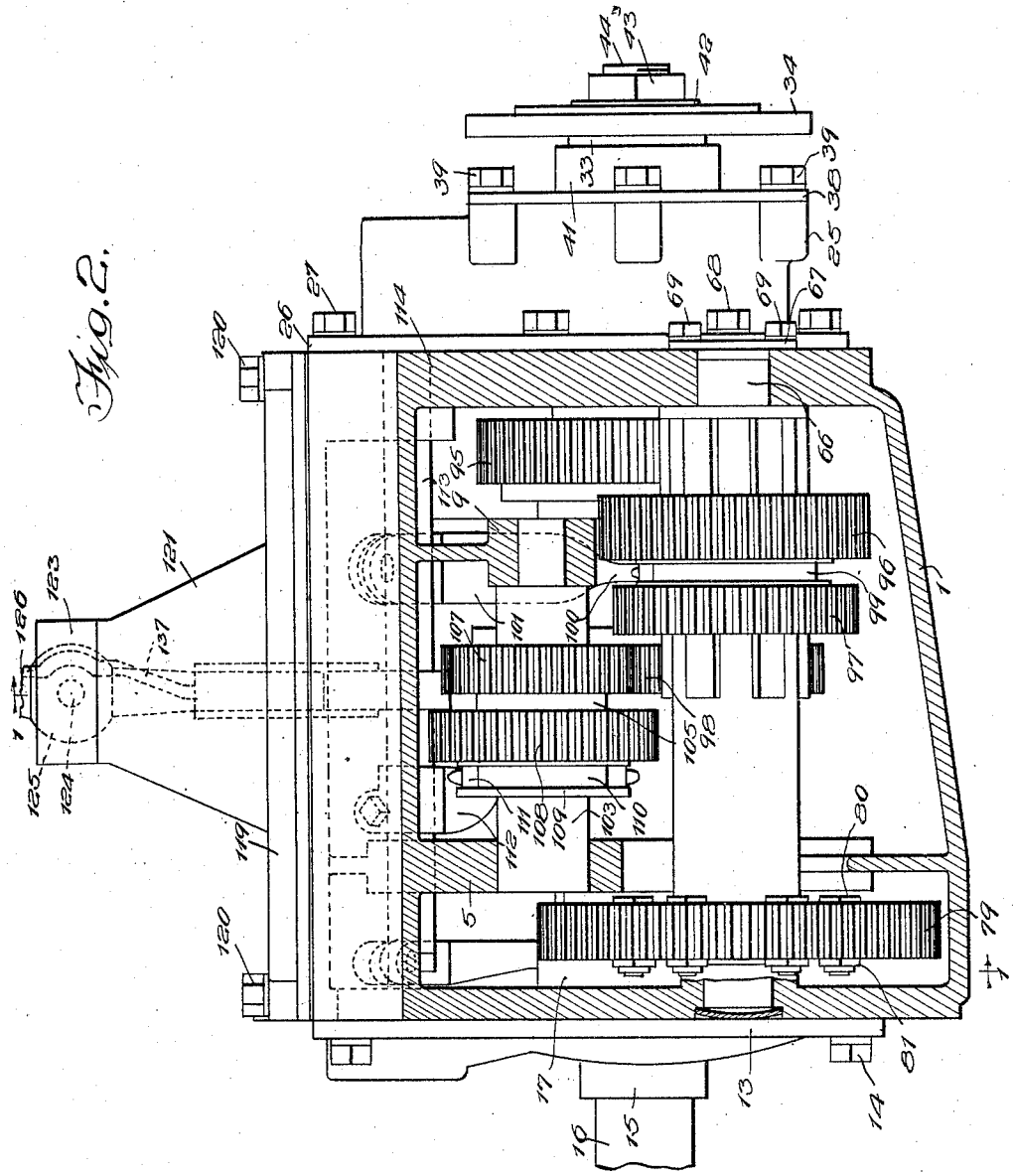

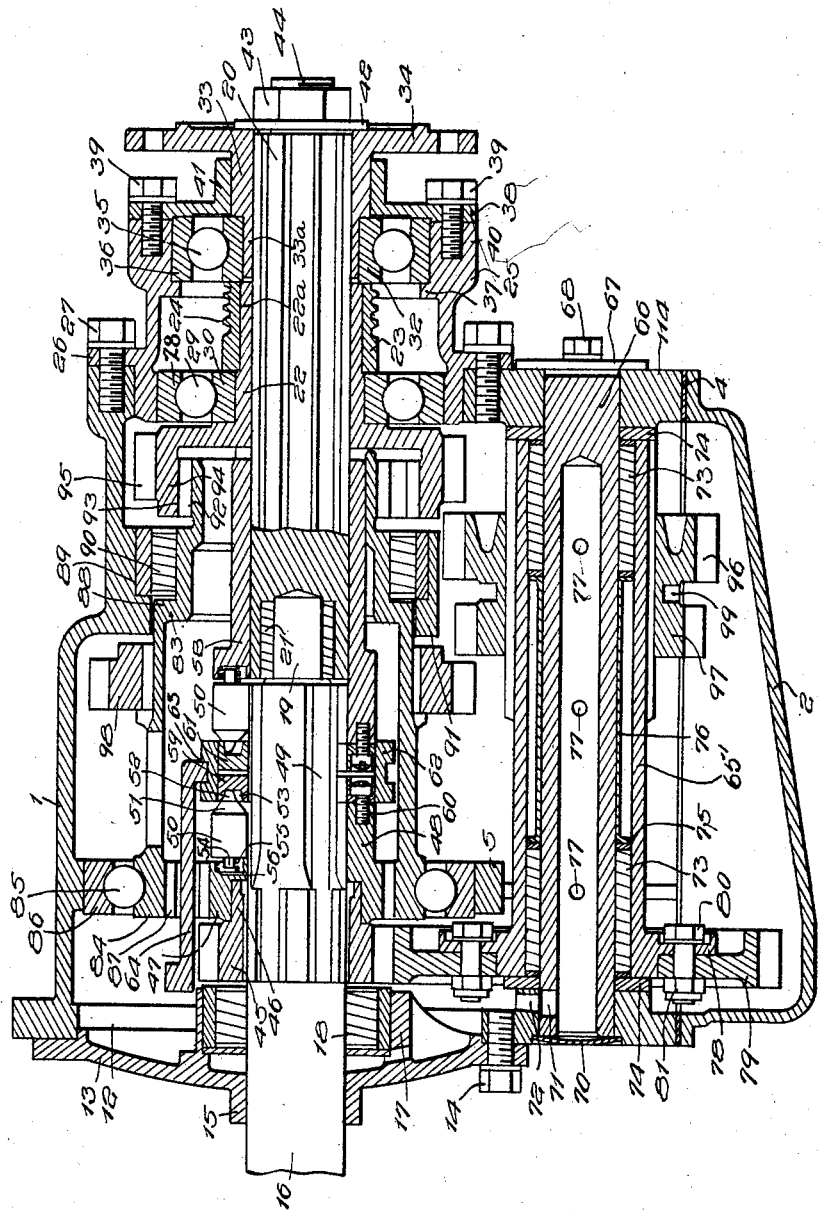

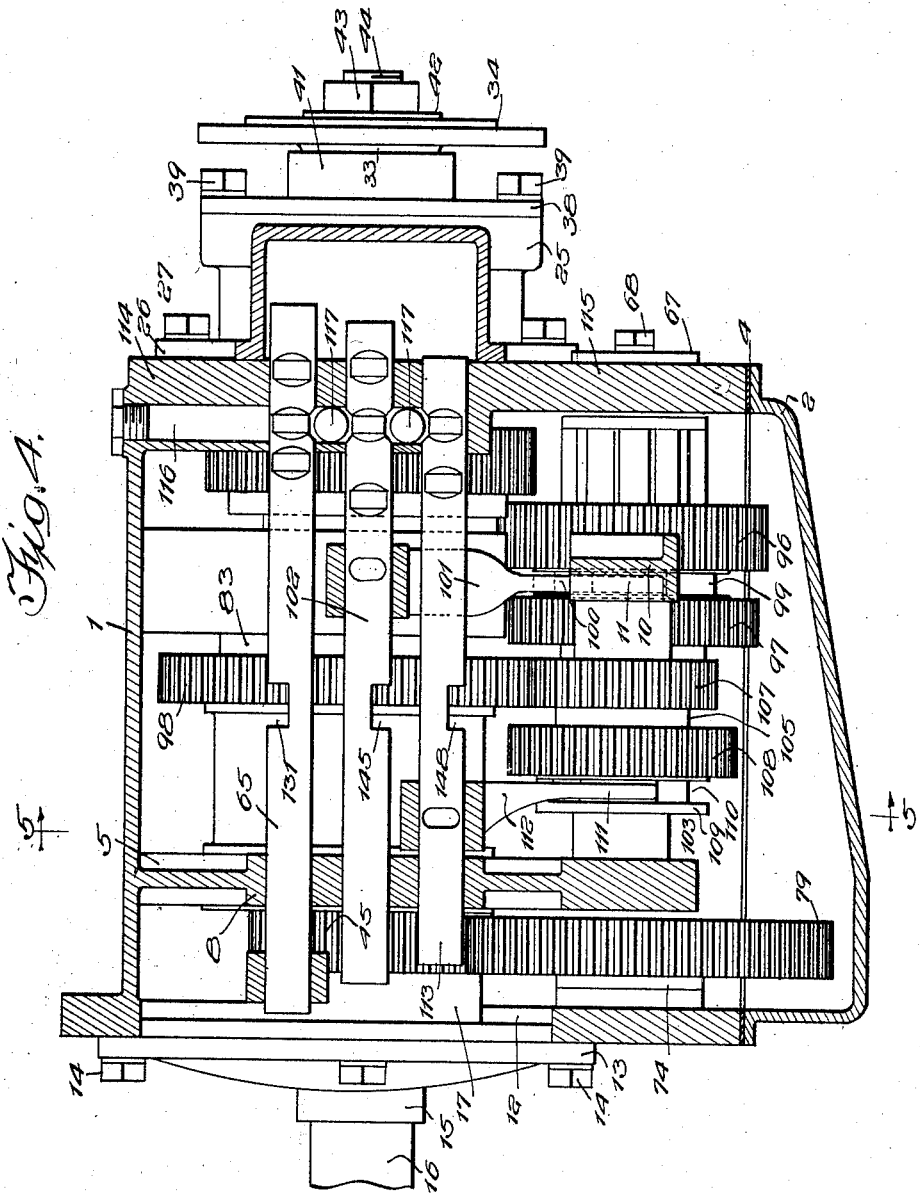

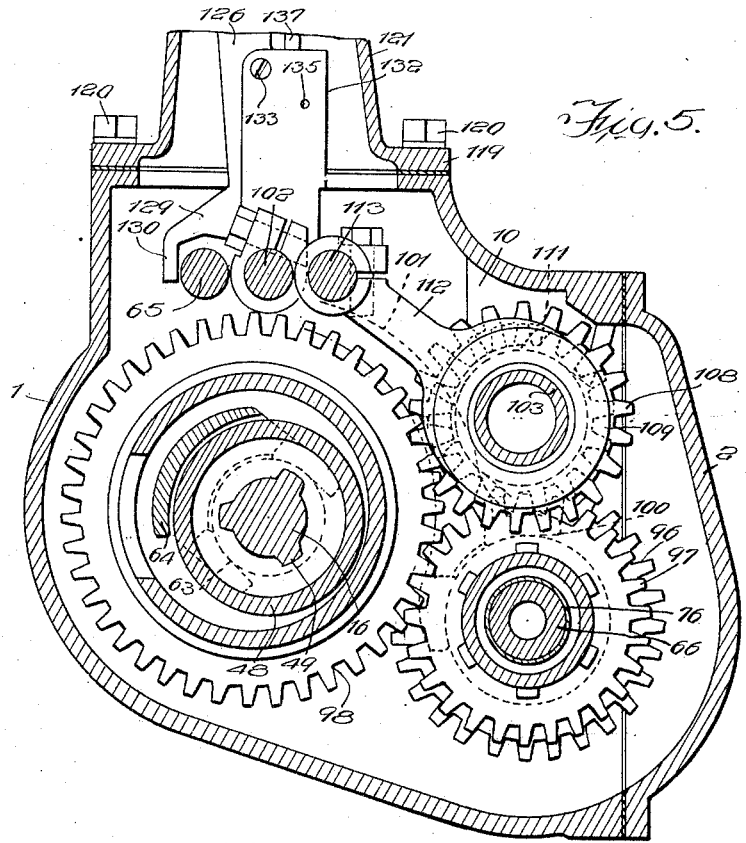
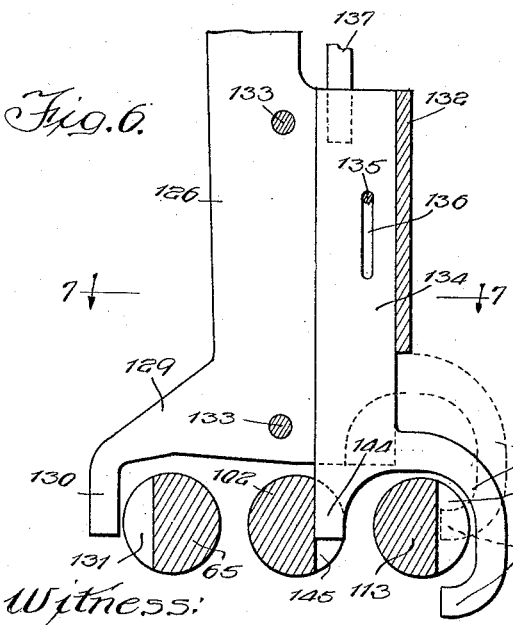
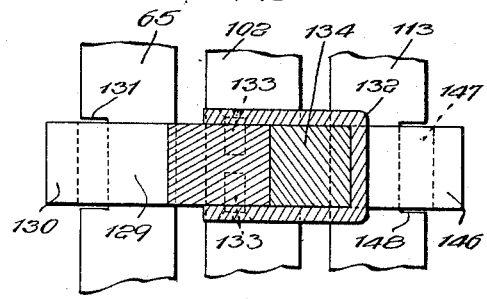

1,912,936

UNITED STATES PATENT OFFICE

THOMAS L. FAWICK, OF RACINE, WISCONSIN, ASSIGNOR TO BROWN-LIPE GEAR COMPANY, OF TOLEDO, OHIO, A CORPORATION OF NEW YORK

TRANSMISSION

Application filed June 10, 1927. Serial No. 197,777.

My invention relates to transmissions for automotive purposes and more particularly to a transmission of the two driving speed type.

In the preferred embodiment I provide a direct drive through the transmission in conjunction with a relatively low rear axle ratio for fast or high speed travel and a reduced internal gear drive in the transmission for conditions where a greater reduction between engine and rear axle is desirable. Obviously the relations may be reversed by a higher gear ratio at the rear axle and an overdrive in the transmission altho I consider the same less desirable.

The preferred embodiment herein disclosed employs four forward speeds and a reverse drive, and all of these drives are selectively under the control of a common shift lever of the well known universal motion type.

This requires five positions of the shift lever.

The usual three speed and reverse type of transmission has been largely standardized and it is desirable to conform as closely as possible to that standard: It is one of the objects of the present invention to arrange the control lever and working parts so as to conform as closely as possible to standard control practice and make the operation as convenient for the operator as possible.

It is desirable that the first speed position and the reverse position of the control lever be opposite each other and in line so that maneuvering of the vehicle be made convenient. In accordance with the present invention I have disposed the first, second, third and fourth positions at the ends of a figure H and at the same time disposed reverse position at the end of one limb of the H opposite the first speed position. This reverse position corresponds also to second speed position but the selection of reverse drive is made by a further selective act or motion on the part of the operator as by lifting a latch or the like.

For further convenience the normal or neutral position of the shift lever is in line with first speed so that all that is required is to pull (or push) upon the control lever to engage first speed without the necessity of lateral motion as heretofore required.

Further improvements reside in the disposal of the eccentric ring gear sleeve preferably above the axial line of the drive shaft so that the control element of the clutching mechanism between motor or driving and driven or propeller shaft may enter the space between the driving pinion and the first internal gear to get inside the said sleeve. Obviously the eccentric sleeve may be so disposed as to let said element enter along the side but the low speed pinion is in the way if the eccentricity is on the bottom.

I have found it somewhat more difficult to make the shift from high speed direct drive to the internal gear drive than vice versa and to facilitate this shift I have provided a form of clutch which is easier to engage than the usual jaw clutch although this particular form of clutch is optional.

Further improvement according to the present invention resides in the employment of a part of the internal gear drive for use in securing the lower ratios for acceleration and reverse and in the lateral displacement of said eccentric sleeve which makes possible a better selection of gear sizes for securing the desired reduction I believe it is novel to mesh a gear on the lay shaft with a gear on the eccentric sleeve.

Obviously certain novel aspects of the present invention may be employed in these speed and reverse transmissions and I do not intend to limit the invention to the specific type or structure shown.

Further objects and advantages will appear from the detail description.

In the drawings:—

Fig. 1 is a transverse sectional view through a transmission constructed in accordance with my invention taken substantially on line 1—1 of Fig. 2;

Fig. 2 is a section taken substantially on line 2—2 of Fig. 1;

Fig. 3 is a section taken substantially on line 3—3 of Fig. 1;

Fig. 4 is a section taken substantially on line 4—4 of Fig. 1;

Fig. 5 is a section taken substantially on line 5—5 of Fig. 4;

Fig. 6 is a detail, partly in section, of the lower portion of the shift lever and associated parts;

Fig. 7 is a section taken substantially on line 7—7 of Fig. 6.

The transmission is housed in a suitable casing 1 which is closed at one side by a plate 2 removably secured to the body of the casing by cap screws 3, or in any other suitable manner, a suitable gasket 4 being interposed between plate 2 and the adjacent edge of the casing to effect an oil tight closure. A bearing ring 5 is formed integrally with the casing and extends transversely thereof adjacent the forward end of the casing. The lower portion of this ring is connected to the lower portion of the casing by a reinforcing web element 6 and the upper portion of the ring is connected to the upper portion of the casing by a web element 7. At its upper portion the ring is provided with an extension 8 forming a support and bearing for the shift rods. The ring is also provided with a lateral extension 9 which is integrally connected to the upper portion of the casing and is disposed in alignment, longitudinally of the casing, with a bracket 10 of T-shape in cross section depending from the top wall of the casing and provided at its lower end with a bearing collar 11, this bracket being disposed adjacent the rearward end of the transmission casing.

At its forward end the casing is provided with an opening 12 which is closed by a flanged plate 13 secured to the end of the casing by cap screws 14. This plate is provided with a central collar 15 through which extends drive shaft 16 which is driven directly from the crank shaft of the engine. On its inner face the plate 13 is provided with a ring 17 which receives an anti-friction bearing 18 of suitable type, such as a roller bearing. Shaft 16 is reduced at its rearward end to provide a stud 19 which projects into an axial bore in the inner or forward end of a driven shaft 20, roller bearings 21 being disposed between the stud and the surrounding wall of the bore into which this stud extends. A sleeve 22 is keyed on shaft 20 and carries a collar 23 secured thereon, this collar being provided with a worm 24 which meshes with a worm wheel (not shown) of an odometer. The driven shaft passes through a cylindrical bearing supporting member 25 which is provided, adjacent its forward end, with an outer peripheral flange 26 which is secured by cap screws 27 to the rearward end of casing 1. A bearing ring 28 is secured in the inner end of member 25 and is provided in its inner face with a circumferential groove forming a raceway for bearing balls 29 which also operate in a raceway formed in the outer face of a bearing ring 30 which is secured on sleeve 22 and abuts the rearward face of an outwardly projecting shoulder 31 at the inner end of sleeve 22. As will be noted more clearly from Fig. 3, the portion 22a of sleeve 22, about which the collar 23 is secured, is reduced in thickness so that the collar abuts the ring 30 and the shoulder thus formed on the sleeve. This collar is confined between ring 30 and the shoulder on sleeve 22 and a bearing ring 32 secured on the inner reduced portion 33a of neck 33 of a coupling member 34 which is keyed on the driven shaft which cooperates with a second coupling member (not shown) for establishing a driving connection between the shaft 20 and the propeller shaft of the automobile. The bearing ring 32 is provided in its outer face with a circumferential groove forming a raceway for bearing balls 35 which also operate in a raceway formed in the inner face of an outer bearing ring 36 mounted in the outer end of member 25 and confined between an inwardly projecting flange 37 formed integrally with this member and a cap plate 38 secured over the outer end of member 25 by cap screws 39, these screws fitting into lugs 40 formed integrally with member 25 at the outer end thereof. Plate 38 is provided with an outwardly extending collar 41 of appreciable width which provides a support and additional bearing for the neck 33.

The drive shaft 16 and the driven shaft 20 are thus disposed in alignment and are mounted by means of the ball bearings and the sleeve bearing in such manner as to insure proper bearing contact throughout sufficient area to eliminate all possibility of binding or undesirable looseness or play of parts. The coupling member 33 is held against endwise movement rearwardly of shaft 20 by a washer 42 of greater diameter than the shaft, this washer being secured in position by a nut 43 threaded upon a screw stud 44 at the rearward end of the shaft 20. Reducing the portion 33a of neck 33 of the coupling member forms a shoulder which abuts the rearward end of the bearing ring 32 and this ring cooperates with collar 23 and ring 31 to hold the coupling member 34 against endwise movement in the other direction, the bearing rings and associated parts cooperating to hold the sleeve 22 against endwise movement in either direction. The various sets of anti-friction bearings thus cooperate with the sleeve and the shaft and associated parts to take both the radial and the endwise thrusts of the shaft and the sleeve maintaining the parts in proper operating relation.

A pinion 45 is keyed on shaft 16 adjacent the rearward end of the roller bearing 18. This pinion is provided at its rearward end with a reduced neck 46 which fits into a pinion 47 at the forward end of a sleeve 48 rotatably mounted upon the shaft 16. The inner or rearward end portion of this shaft is provided with three radially disposed ribs 49 (Fig. 5). The sleeve is provided with suitably spaced openings for reception of clutch rollers 50. The rearward end of the clutch roll 50 is of tapered or conical shape as indicated by 51, and is provided with an extension 52 which projects into a recess 53 in the sleeve 48. The roller is further provided, at the center of its base with a stud 54 which projects into a recess 55 in the rear wall of pinion 47. An expansion coil spring 56 is mounted about stud 54 and confined between the roller and the forward end wall of the recess 55. It will be noted that the recesses 53 and 55 are of much greater length radially of the sleeve than the diameters of the elements 52 and 54, respectively, these recesses being really in the nature of slots which permit movement of the roller radially of the sleeve toward and away from the shaft. The spring 56 exerts pressure which serves to hold the roller in position when the shaft 16 is stationary and the sleeve 48 is disconnected from this shaft. Preferably the rollers 50 are arranged in pairs there being, in this instance, six rollers arranged in three pairs, the rollers of each pair being disposed to receive between them one of the ribs 49 of the shaft, when these rollers are moved inwardly toward the shaft. A sleeve 58 is keyed on the forward portion of shaft 20 and is provided with a plurality of openings which also receive clutch rollers 50 mounted therein in the same manner as the rollers 50 are mounted in the sleeve 48. For convenience in assembly, the inner end of the sleeve 48 is formed of a ring 59 which is secured to the end of the sleeve by screws 60, or in any other suitable manner, the recesses 53 being provided in the forward face of this ring. A similar ring 61 is secured to the forward end of sleeve 58 and is provided with recesses for reception of the reduced elements at the forward tapered ends of the rollers 50. These rings slidably receive a shift collar 62 mounted thereon. When this collar is in its neutral position illustrated in Fig. 3, the rollers 50 are thrown outwardly by centrifugal force, as well as by the action of the ribs 49, upon rotation of shaft 16, into inoperative position. This permits rotation of the drive shaft independently of the pinion 47 as well as of the driven shaft 20. The shift collar 62 is provided with a circumferential groove which receives the fingers 63 of a shift arm 64 which is secured to a shift rod 65 for movement therewith. When the collar 62 is shifted into its forward operative position the rollers 50 of sleeve 48 are forced inwardly of the sleeve radially thereof so as to contact with the ribs 49 of the shaft 16 at opposite sides of the ribs. This serves to effectually clutch the sleeve 48, and consequently pinion 47, to the drive shaft for rotation therewith. When the collar 62 is shifted rearwardly into operative position the sleeve 58 is clutched to shaft 16 thus establishing a direct driving connection between this shaft and the driven shaft 20. This type of clutch is disclosed in the patents to W. A. McCarrell, 1,380,917 and 1,590,304, and is known in the art as the McCarrell clutch. As this type of clutch is known it is not thought necessary to illustrate and describe the same further here.

A counter or lay-shaft 65' is rotatably mounted in the casing 1 below shaft 16. This lay-shaft 65' is in the form of a sleeve disposed about a pin 66 extending through the end walls of the casing and secured against endwise movement by a flanged disc 67 which is secured to the rearward end of the pin by a cap screw 68, this disc being secured to the casing by cap screws 69. The pin 66 is bored out from its other end and is closed by a spring cap 70 which can be sprung into a suitable recess in the casing concentric with the forward end of the pin. The pin is provided with a radial opening 71 adjacent its forward end which is disposed in alignment with an opening 72 extending through an adjacent flange of the casing 1 to admit lubricant into the bore of the pin. The lay-shaft or sleeve 65' is mounted, at each end, on roller bearings 73 which surround the pin 66, these bearings being confined between washers 74 disposed between the bearings and the end walls of the casing and flanges 75 at the ends of a spacing sleeve 76 disposed about the central portion of pin 66 and within the sleeve 65. Lubricant is supplied to the bearings 73 and to the contacting surfaces of the sleeve 76 and the pin, through suitably disposed openings 77 extending radially of the pin from the bore thereof. The roller bearings 73 provide ample bearing surface for the sleeve or lay-shaft 65' and serve to effectually prevent any undesirable looseness or play of this shaft.

The counter or lay shaft 65' is provided, adjacent its forward end, with an outwardly projecting radial flange 78 to which is secured a spur ring gear 79, by means of bolts 80 and nuts 81 threaded thereon, or in any other suitable or preferred manner. This ring gear meshes with pinion 45 so as to be rotated thereby upon rotation of the drive shaft 16.

A sleeve 83 is disposed about the shafts 16 and 20 in eccentric relation thereto. This sleeve is provided at its forward end with a thickened flange 84 provided in its outer face with a groove forming a raceway for bearing balls 85 which also operate in a raceway in a bearing ring 86 secured in the ring member 5 of the casing. This sleeve is provided with an internal gear 87 which meshes with the pinion 47 at the under portion of shaft 16. By this arrangement the upper portion of the sleeve 83 is spaced away from the upper portion of the pinion 47 and permits the shift arm 64 to be introduced directly into the sleeve from the forward end thereof, thus providing extremely simple and highly efficient means for operating the clutch collar 62.

Sleeve 83 is reduced adjacent its rearward end to form a shoulder 88 which forms with a recess 89 in the casing, an annular space for reception of a roller bearing construction 90 which serves to support the rearward portion of the sleeve and to take up radial thrust thereof. The ball bearing at the forward portion of the sleeve takes both axial and radial thrust of the sleeve so that the sleeve is thus mounted in such manner as to provide ample bearing surfaces to prevent looseness or play of the sleeve and is effectually held against endwise movement. To support the lower portion of the bearing 90 the casing is provided with an integral supporting element 91 of arcuate shape disposed concentric with the reduced portion of the sleeve and having a recess forming a continuation of the recess 89.

Sleeve 83 is provided, at its rearward end, with an external gear 92 which meshes with an internal gear 93 on the inner face of flange 94 which is formed integrally with the flange or shoulder 31 of sleeve 22. Flange 94 is also provided with an external gear 95. When sleeve 48 is clutched to the drive shaft 16 a gear ratio drive is established between the drive shaft and the driven shaft by means of pinion 47, internal gear 87, external gear 92 and internal gear 93 of the sleeve 22. This constitutes the third speed connection between the drive shaft and the driven shaft. When the clutch ring or collar 62 is shifted rearwardly so as to clutch sleeve 58 to the drive shaft 16, the drive shaft and the driven shaft are clutched together for direct drive, as previously noted, which provides the fourth or high speed connection between the shafts.

A pair of integrally connected spur gears 96 and 97 are splined on the sleeve or layshaft 65. Gear 96 is of proper diameter to mesh with the external gear 95 when shifted into operative relation thereto, gear 97 being of a diameter to mesh with an external gear ring 98, of greater diameter than external gear 95, keyed on the sleeve 83 adjacent shoulder 88, when the gear 97 is shifted forwardly of the casing into operative position. The gear unit composed of the gears 96 and 97 is provided with a central circumferential groove 99 which receives the fork 100 of a shift arm 101 which is keyed on a shift rod 102 disposed adjacent the rod 65. With the parts in the position illustrated in Fig. 3, when it is desired to start the automobile the gear unit on the lay-shaft is shifted forwardly so as to bring gear 97 into mesh with gear ring 98. This gives a low speed forward driving connection from the drive shaft to the driven shaft through pinion 45, gear 79, the lay-shaft shaft or sleeve 65, gear 97, gear ring 98, sleeve 83, and external gear 92 and internal gear 93 of sleeve 22. Shifting the gear unit rearwardly so as to bring gear 96 into mesh with external gear 95 gives the second speed forward connection between the two shafts, the drive in this instance being around the sleeve 83. When the third and fourth speeds are used the gear unit is in its neutral or inoperative position illustrated in Fig. 3. It will be noted that the gear unit consisting of the gears 96 and 97 is shifted into either of its operative positions, or into neutral position, by a straight line movement of the shift rod 102. It is thus possible to shift from low to second, or vice versa, with a straight line movement of shift lever and without any necessity for rocking this lever laterally. It is also possible, as previously pointed out, to shift from third to fourth speeds and vice versa by a straight line movement of the shift lever.

A reverse gear spindle 103 (Fig. 4) is mounted in the extension 9 of the supporting member 5, at one end, the other end of this spindle being reduced and mounted in the bearing sleeve 11 at the lower end of bracket 10. This spindle is secured in position by a cap screw 104 threaded through member 9 and engaging into the spindle. A reverse gear unit 105 is loosely mounted on spindle 103 and includes two spur gears 107 and 108 which are integrally or otherwise rigidly secured together. This unit is provided, at its forward end, with a neck 109 having a circumferential groove 110 which receives fork 111 of a shifting arm 112 keyed on a shift rod 113 disposed at the opposite side of rod 102 from the shift rod 65. The gear 107 is of proper diameter to not mesh with gear ring 98 when the reverse gear unit is in neutral position, gears 107 and 108 being so proportioned that gear 107 meshes with gear 97 and gear 108 meshes with gear ring 98 when the reverse gear unit is shifted rearwardly into operative position. In view of the fact that the drive for gear ring 98 is taken, at this time, from gear 97 through the interposed gears 107 and 108, the driven shaft 20 is rotated in a reverse direction through the gear ring 98 and associated parts thus giving the reverse drive. When the gear unit comprisng the gears 96 and 97 is shifted forwardly into low speed position to mesh with the gear ring 98, the reverse gear unit being in neutral position, gear 97 will mesh with gear 107. It should be noted, however, that this in no way affects the drive between the gear 97 and the gear ring 98, the reverse gear unit idling on the spindle 103 at such time.

The forward ends of the shift rods are slidably mounted through the extension 8 of the supporting ring 5. The rearward ends of these rods are slidably mounted through a thickened portion 114 of the upper portion of the rear end wall of casing 1. Each of the rods 65 and 102 is provided, in the upper portion thereof with three suitably spaced depressions which cooperate with spring shift locking balls (not shown) mounted in the upper part of the rear wall of the casing for holding these rods in either forward or rearward operative position or in neutral position. The rod 113 is provided with two depressions for holding this rod in either operative or inoperative position. As the arrangement and function of these spring pressed locking balls is well known in this art illustration or further description of the same is unnecessary. The thickened portion 114 of the wall 115 is bored out from one side of the casing to provide a cylindrical chamber 116 which permits of insertion of locking balls 117 disposed between the rods and cooperating with notches therein for positively locking the adjacent rod in neutral position when any one, selectively, of the rods is operated.

The top of casing 1 is closed by a cover 119 secured in position by cap screws 120 passing through the cover and threading into the end walls of the casing. This cover is provided, at its central portion, with an upwardly tapering hollow pedestal 121 provided at its upper end with an inwardly projecting shoulder 122 which is exteriorly threaded for reception of a securing and closure cap 123 threaded thereon. A pin 124 is secured in shoulder 122 diametrically thereof, this pin being disposed at right angles to the axis of the drive shaft 16 and passing through ball 125 of a shift lever 126. This ball is provided with an opening 127 which receives the pin and is so shaped as to permit rocking movement of the lever a predetermined distance in a counter clockwise direction or toward the left as considered in Fig. 1, while preventing rocking movement of the lever in a clockwise direction as considered in this figure. The lever is otherwise free from the pin and can be rocked about the same forwardly and rearwardly of the transmission casing. Cap 123 is provided, at the upper end thereof, with an inwardly projecting flange 128 which fits snugly about the upper portion of the ball 125 so as to form a snug closure about the same while permitting ready movement of the lever in operation thereof.

The lever 126 is provided at its lower end with a member 129 which projects to the left of the lever as considered in Figs. 1 and 2. This member is provided at its outer end with a finger 130 disposed to engage into a notch 131 in the outer side portion of shift rod 65 when the shift lever is rocked laterally on the pin 124 toward the left. The member or arm 129 is of such length that the finger 130 is disposed outwardly beyond the notch 131 when the lever is in its normal upright or vertical position. It will thus be seen that the lever can be moved either forwardly or rearwardly with a straight line movement without operating the shift rod 65.

A keeper 132 of substantially U-shape in cross section is secured to the lower portion of lever 126 by screws 133, or in any other suitable manner. A bolt 134 is slidably mounted in this keeper for vertical movement and is confined against lateral movement between the outer wall of the keeper and the inner edge of the lever. Movement of this bolt vertically in either direction is limited by a stop pin 135 which is secured through the keeper and projects through a slot 136 extending longitudinally of the bolt. An operating rod 137 is secured at the upper end of the bolt and passes through ball 125, the upper end of this rod being connected to a collar 138 disposed about the upper portion of the lever in spaced relation thereto and having an outwardly projecting element 139 forming a finger grip. An expansion coil spring 140 is mounted about the upper portion of the lever and is confined between a flange 141 projecting inwardly from the lower end of the collar 138 and a collar 142 at the lower end of a ball 143 secured on the upper end of the lever. The lower end of this bolt is shaped to provide a finger 144 adapted to engage into a slot 145 in the shift rod 102 at the opposite side thereof from slot 131 of rod 65. The bolt is also provided at its lower end with an outwardly projecting arcuate element or arm 146 having its lower end portion shaped to provide an inwardly projecting finger 147 which is disposed to engage into a notch 148 in the shift rod 113 at the outer side thereof. Normally the spring 140 holds bolt 134 in its lowered position, in which position of the bolt finger 144 engages into notch or slot 145 and finger 147 is disposed below the shift rod 113. With the shift lever in neutral position and the bolt 134 lowered, finger 144 engages into notch 145 of rod 102 and the fingers 130 and 147 are out of operative relation to their respective shift rods.

When starting the automobile, the shift lever is rocked rearwardly thus moving the shift rod 102 forwardly and with it the associated gear shift unit bringing the gear 97 into mesh with gear ring 98. The shift into second gear may then be readily accomplished by a straight forward movement of the shift lever so as to bring the gear 96 into mesh with gear ring 95. By rocking the shift lever to the right on the pin 124, finger 144 is then disengaged from the notch 145 and finger 130 is brought into engagement with notch 131 and the transmission is thrown into third gear by then rocking the lever forwardly about the pin moving the shift rod 65 and the clutch ring or collar 62 associated therewith rearwardly of the transmission casing. It will thus be seen that the shift from low to second gear and vice versa, and from third to fourth gear and vice versa, can be effected by a simple straight line movement of the shift lever and without any necessity for moving the lever from one position to another position diagonally opposite thereto as in the H type of gear shift. Attention is called to the fact that Figs. 1, 5 and 6 are taken looking rearwardly of the transmission so that, while the lever is swung to the left as considered in these figures to bring the finger 130 into notch 131 of shift rod 65, in driving the automobile the shift lever is actually rocked to the right so as to be out of the way when driving at the higher speeds.

When it is desired to reverse, the bolt 134 is raised into its uppermost position by grasping ball 143 and pulling upwardly on member 139 with the finger. This raises the bolt into the position indicated by dotted line in Fig. 6 so as to withdraw finger 144 from the notch 145, finger 147 being raised into position to engage into its notch 148, as indicated. The shift lever is then rocked forwardly into second speed forward position thus moving the shift rod 113, and the reverse gear unit associated therewith, rearwardly of the transmission casing to bring gears 97 and 107 and gears 98 and 108 into mesh reversing the direction drive of the shaft 20. Obviously, when the shift lever has been rocked into this position, finger 144 will be out of alignment with its notch 145 and the rod 102 will prevent downward movement of bolt 134 so that member 139 can be released as soon as the shift lever has been moved into reverse position. By swinging the lever rearwardly into low speed position the bolt 134 will be depressed by spring 140 as soon as finger 144 is brought into alignment with notch 145 of rod 102 and continued rearward movement of the lever will bring gear 97 into mesh with gear ring 98 thus shifting into low speed position. It will thus be seen that the position of the shift lever in reverse coincides with its position in second speed forward and that it is possible to quickly change from reverse to low speed by a simple straight line movement of the shift lever. This arrangement is of practical value in cases where it is desired to shift quickly from reverse to low or vice versa, as in jockeying the automobile first forwardly and then rearwardly at short intervals, preliminary to shifting into second gear.

What I claim is:—

1. In a transmission of the character described, a drive shaft, a driven shaft, a sleeve rotatably mounted about the drive shaft eccentric thereto and provided with an internal gear, a pinion loose on the drive shaft and meshing with the gear below said shaft, a gear ratio driving connection between the sleeve and the driven shaft, means for clutching the pinion to the drive shaft or for clutching the driven shaft to the drive shaft for direct drive, optionally, said means including a shiftable member, a shift arm extending into the sleeve between the same and the upper portion of the drive shaft, and means for operating said arm.

2. In a transmission of the character described, a drive shaft, a driven shaft, a sleeve rotatably mounted about the drive shaft eccentric thereto and provided with an internal gear, a pinion loose on the drive shaft and meshing with the gear below said shaft, a gear ratio driving connection between the sleeve and the driven shaft, a second sleeve splined on the driven shaft, means for clutching the pinion to the drive shaft or for clutching the second sleeve to the drive shaft, optionally, said means including a shiftable member, a shift arm extending into the sleeve between the same and the upper portion of the drive shaft, and means for operating said arm.

3. In a transmission of the character described, a drive shaft, a driven shaft, a sleeve rotatably mounted about the drive shaft and having an internal gear, a pinion loose on the drive shaft and meshing with said gear, a second sleeve secured on the driven shaft, a gear ratio drive between the sleeves, a third sleeve secured on the driven shaft, and having relative position longitudinally of said shaft, and means for clutching the pinion to the drive shaft or for clutching the third sleeve to the drive shaft for direct drive between the shafts, optionally.

4. In a transmission of the character described, a drive shaft, a driven shaft, a sleeve rotatably mounted about the drive shaft and having an internal gear, a pinion loose on the drive shaft and meshing with said gear, a second sleeve secured on the driven shaft, a gear ratio drive between the sleeves, a third sleeve secured on the driven shaft, means for clutching the pinion to the drive shaft or for clutching the third sleeve to the drive shaft for direct drive between the shaft, optionally, an external gear on the second sleeve, a second pinion secured on the drive shaft, a lay shaft, a gear secured on the lay shaft and meshing with the second pinion, an external gear on the first sleeve, a pair of gears splined on the lay shaft, one of the gears of the pair meshing with the external gear of the second sleeve when said pair is in one position and being out of mesh therewith when said pair of gears is shifted into its other position, a reverse shaft, a pair of rigidly connected reverse gears slidable on the reverse shaft, one of the reverse gears meshing with the external gear of the first sleeve and the other reverse gear meshing with the other one of the pair of gears on the lay shaft when the reverse gears are shifted into operative position, and means for selectively shifting the pairs of gears and the clutch means.

5. In a gearing, a casing, a pair of rotatable members, extending thereinto in mutual alignment and substantially abutting relation, a gear on one of the members, a gear for the other, a hollow gear member in surrounding relation to one of said members and having a plurality of sets of teeth, one set for each of the gears respectively, a bearing for supporting the hollow gear member carried by the casing and located exteriorly of the hollow gear in radial alignment with one of said sets of teeth of the hollow gear, and clutch means operating in bridging relation to the adjacent ends of said rotatable members and arranged to render the gear train drivingly idle when in one position and to at such time directly connect the said rotatable members together.

6. In a gearing, a casing, a pair of rotatable members extending thereinto in mutual alignment and substantially abutting relation, a gear on one of the members, a gear for the other member, a hollow gear in surrounding relation to one of said members and having a plurality of sets of teeth, one set for each of the gears respectively, bearing means for supporting the hollow gear member, clutch means operating in bridging relation to the adjacent ends of said rotatable members and arranged to render the gear train drivingly idle when in one position and to at such time directly connect the said rotatable members together, and means extending lengthwise from one end of the hollow gear for operating said clutch means.

In witness whereof, I hereunto subscribe my name this sixth day of June, 1927.

THOMAS L. FAWICK.

CERTIFICATE OF CORRECTION.

Patent No. 1,912,936. June 6, 1933.

THOMAS L. FAWICK.

It is hereby certified that error appears in the printed specification of the above numbered patent requiring correction as follows: Page 6, line 95, claim 3, before "position" insert the word "fixed"; and that the said Letters Patent should be read with this correction therein that the same may conform to the record of the case in the Patent Office.

Signed and sealed this 22nd day of August, A. D. 1933.

(Seal)

M. J. Moore.
Acting Commissioner of Patents.